(12) United States Patent
Peters et al.

(10) Patent No.: US 8,441,403 B2
(45) Date of Patent: May 14, 2013

(54) SECURITY DOCUMENT (75) Inventors: John Anthony Peters, Au/Schweiz (CH); Ulrich Schindler, Furth/Bayern (DE)

(73) Assignee: Leonhard Kurz Stiftung & Co. KG, Furth (DE)

( * ) Notice: Subject to any disclaimer, the term of this patent is extended or adjusted under 35 U.S.C. 154(b) by 484 days.

(21) Appl. No.: 12/792,200

(22) Filed: Jun. 2, 2010

(65) Prior Publication Data
US 2010/0328922 A1 Dec. 30, 2010

(30) Foreign Application Priority Data

Jun. 3, 2009 (DE) .......................... 10 2009 023 715

(51) Int. Cl.
*H01Q 7/00* (2006.01)
(52) U.S. Cl.
USPC ........... 343/741; 343/866; 343/867; 343/895; 235/375; 235/492; 361/816
(58) Field of Classification Search .................. 343/741, 343/742, 866, 867, 873, 895; 235/375, 385, 235/492; 361/762, 816, 818
See application file for complete search history.

(56) References Cited

U.S. PATENT DOCUMENTS

| | | | |
|---|---|---|---|
| 7,083,083 B2 | 8/2006 | Droz | |
| 7,581,308 B2 * | 9/2009 | Finn | ................................ 29/600 |
| 8,240,022 B2 * | 8/2012 | Finn | ............................ 29/592.1 |
| 2008/0001844 A1 | 1/2008 | Sabbah et al. | |
| 2010/0277382 A1* | 11/2010 | Tanaka et al. | ................. 343/741 |
| 2012/0043386 A1* | 2/2012 | Gotou | ........................... 235/492 |

FOREIGN PATENT DOCUMENTS

DE 102005050099 4/2007

* cited by examiner

*Primary Examiner* — Tho G Phan
(74) *Attorney, Agent, or Firm* — Hoffman & Baron, LLP (57) ABSTRACT

A security document (1) in the form of a booklet which has a large number of sheets (11, 12, 13) connected to one another to form the booklet. A first sheet (11) of the security document has a carrier layer (20), an antenna structure (21)—arranged in a first region (41)—for RF communication and an electronic circuit (22)—connected to the antenna structure (21)— with a memory device for storing data, and a communication device—connected to the antenna structure—for communicating data stored in the memory device to a reader via a radio interface by means of the antenna structure (21). A second sheet (13) of the security document has a carrier layer (30) and one or more electrically conductive layers shaped in a second region (43) for the formation of at least one LCR resonant circuit (3). The antenna structure (21) and the at least one LCR resonant circuit (3) are arranged on the respective carrier layer in such a way that, when the booklet is closed, the first region (41) of the first sheet (11) and the second region (43) of the second sheet (13) overlap at least in some regions and the at least one LCR resonant circuit (3) is electromagnetically coupled to the antenna structure (21).

34 Claims, 7 Drawing Sheets

SECURITY DOCUMENT

BACKGROUND OF THE INVENTION

The invention relates to a security document in the form of a booklet which has a large number of sheets connected to one another to form the booklet, and which furthermore has a transponder.

A security document of this type is known from U.S. Pat. No. 7,083,083 B2, for example, which describes arranging a transponder on one side of a document and providing a shielding element on another side of the document, said shielding element consisting of a continuous metal layer. In this case, the shielding element is arranged on the side of the document in such a way that when the document is folded up, that is to say when the document is closed, the shielding element covers the transponder at least in some regions. This is intended to have the effect that, when the document is closed, the shielding element prevents the transponder from being read by virtue of said shielding element absorbing the signal communicated by the reader.

OBJECTS AND SUMMARY OF THE INVENTION

The invention is based, then, on the stated object of providing an improved security document.

This object is achieved by a security document in the form of a booklet which has a large number of sheets connected to one another to form the booklet, wherein it is provided that a first sheet of the security document has a carrier layer, an antenna structure—arranged in a first region—for RF communication (RF=Radio Frequency) and an electronic circuit—connected to the antenna structure—with a memory device for storing data, and a communication device—connected to the antenna structure—for communicating data stored in the memory device to a reader via a radio interface by means of the antenna structure, that a second sheet of the security document has a carrier layer and one or more electrically conductive layers shaped in a second region for the formation of at least one LCR resonant circuit (LCR resonant circuit=resonant circuit comprising at least one inductive element (L), at least one capacitive element (C) and at least one resistive (resistance) element (R)), and that the antenna structure and the at least one LCR resonant circuit are arranged on the respective carrier layer in such a way that, when the booklet is closed, the first region of the first sheet and the second region of the second sheet overlap at least in some regions and the at least one LCR resonant circuit is electromagnetically coupled to the antenna structure. In this case, the electromagnetic coupling can be, in particular, an inductive or capacitive interaction between the antenna structure and the LCR resonant circuit.

What is achieved by means of the invention is, firstly, that, in the opened state of the booklet or book, the data stored in the memory device can be read out via the communication device by means of the reader and, when the booklet or the book is closed, a read-out of the data stored in the memory device is made more difficult or prevented. This is because investigations have shown that the above-described measure in which a whole-area electrically conductive layer is used for the absorption of the read signal transmitted by the reader is effective only when said whole-area metal layer is arranged between reader and transponder. If the position of the reader is therefore correspondingly altered and the reader is arranged for example on that side of the transponder which is remote from the absorbent metal layer, then the transponder can still be read. By virtue of the invention, by contrast, reading of the transponder is made more difficult or prevented independently of the position of the reader. By virtue of the fact that, when the document is closed, the LCR resonant circuit is caused to overlap the antenna structure and is electromagnetically coupled to the antenna structure, the antenna resonant circuit of the communication device is detuned and the RF communication with the reader is thus made more difficult or prevented independently of the positioning of the reader. The detuning of the antenna resonant circuit signifies a targeted alteration of the resonant frequency of the antenna resonant circuit or of the totality of the antenna structure and the LCR resonant circuit electromagnetically coupled thereto. In particular, the resonant frequency is either increased or decreased.

The invention is further distinguished by the fact that it enables the read-out of data from the memory to be prevented or made more difficult in the closed state of the security document in a particularly cost-effective manner and in a manner substantially free of wear and independently of ambient influences: and this is because no active electrical components, switches and similarly expensive and fault-susceptible parts are required. The amount of material for the electrically conductive layer(s) that is (are) additionally to be provided and is (are) shaped in a patterned fashion is very small alongside the layer thickness required for the additional layer(s), such that this advantage can be achieved with comparatively very little outlay on material. Subsequently, the layer thickness of the second sheet is influenced only insignificantly by these additional measures, such that said second sheet can be integrated into existing security documents without altering the basic construction thereof or the tactile properties thereof.

Advantageous embodiments of the invention are designated in the dependent claims.

In accordance with one preferred exemplary embodiment of the invention, the at least one LCR resonant circuit has a resonant frequency which differs by at least 10%, preferably by at least 25%, from the carrier frequency (e.g. 13.56 MHz) used for the RF communication between reader and communication device and/or from the resonant frequency of the antenna resonant circuit comprising the antenna structure in the open state of the booklet. With further preference, this difference is between 25% and 75%, in particular between 50% and 60%, with further preference between 10% and 85%, in particular between 19% and 34%.

If the booklet is opened, such that the first sheet and the second sheet no longer overlap, then the antenna structure is no longer electromagnetically coupled to the at least one LCR resonant circuit and the antenna resonant circuit thus has its resonant frequency tuned to the carrier frequency of the RF communication between reader and communication device, such that an RF communication between reader and communication device is possible. If the booklet is closed, such that the first and the second sheets overlap, then the LCR resonant circuit is coupled to the antenna structure and the antenna resonant circuit is detuned by this coupling. The abovementioned dimensioning of the at least one LCR resonant circuit ensures in most cases that the detuning of the antenna resonant circuit when the booklet is closed is sufficiently great to reliably prevent an RF communication between reader and communication device.

Preferably, the resonant frequency of the LCR resonant circuit is chosen such that when the LCR resonant circuit is electromagnetically coupled to the antenna structure in the "closed" position of the booklet, the resonant frequency of the antenna resonant circuit is detuned in such a way that the resonant frequency of the antenna resonant circuit is shifted between 25% and 75%, in particular between 30% and 50%, and/or the resonant frequency is shifted between 2 MHz and 12 MHz, in particular between 8 MHz and 10 MHz, preferably the resonant frequency of the antenna resonant circuit is reduced down to at least a value of 10% of the carrier frequency or increased to at least a value of 47% of the carrier frequency, preferably reduced to a value of 41% or increased to 84% of the carrier frequency. Given a carrier frequency of approximately 13.56 MHz, it is thus advantageous if the resonant frequency of the antenna resonant circuit is detuned to less than 12 MHz, with further preference less than 8 MHz, or more than 20 MHz, with further preference more than 25 MHz.

This results in particularly reliable prevention of the communication between reader and communication device when the booklet is closed. It is particularly advantageous in this case if the shift in the resonant frequency is sufficiently great that a decoding or a coding of a signal with such a carrier frequency, i.e. a frequency corresponding to the resonant frequencies of the detuned antenna resonant circuit, by the communication device is no longer possible. This improves security further.

It has proved to be advantageous to use, as LCR resonant circuit, a resonant circuit having an inductance of 1 µH to 25 µH, a capacitance of 10 pF to 200 pF and a quality factor of 5 to 50. The resonant frequency of the at least one LCR resonant circuit is preferably between 2 MHz and 12 MHz, with further preference between 9 MHz and 11 MHz, with further preference between 6 MHz and 8 MHz.

In accordance with a further preferred exemplary embodiment, the external dimensions of the at least one LCR resonant circuit are advantageously larger than the external dimensions of the antenna structure by at least 5%.

In accordance with a further preferred exemplary embodiment, alongside the LCR element or elements in direct spatial proximity, additional shielding elements, which can be very varied in terms of form, arrangement and embodiment, are concomitantly used and are in this case shaped in such a way that they absorb the signal communicated by the reader.

In accordance with a further preferred exemplary embodiment, alongside the LCR element or elements in direct spatial proximity, additional shielding elements, which can be very varied in terms of form, arrangement and embodiment, are concomitantly used and are in this case shaped in such a way that they absorb the signal communicated by the reader and additionally extend over the folding lines right into the region of the antenna structure.

In accordance with one preferred embodiment of the invention, the at least one LCR resonant circuit has one or more coil-type conductor structures which are shaped in the electrically conductive layer or which are shaped in the electrically conductive layers and which in each case enclose a first area region at least to the extent of 75%, preferably enclose the first area region at least to the extent of 40% of the side area. Spiral conductor structure is thus understood to mean a conductor structure having a 75% turn or more, i.e. number of turns $\geq 0.75$. Furthermore, it is also advantageous if two or more coil-type conductor structures are molded in the one or more electrically conductive layers. These coil-type conductor structures firstly result in a sufficient inductance of the LCR resonant circuit and secondly enable an inductive coupling between antenna structure and LCR resonant circuit as electromagnetic coupling.

Preferably, the coil-type structures each have between 0.75 and 30 turns, with further preference between 6 and 10 turns, with further preference between 3 and 10 turns. The turns of the conductor tracks of each of the coil-type structures are preferably spaced apart from one another by less than 0.8 mm, with further preference spaced apart from one another by 0.05 mm to 0.5 mm. Preferably, the conductor tracks of the coil-type structures each have a width of less than 5 mm, preferably between 0.05 mm and 5 mm, with further preference between 0.1 mm and 3 mm.

In accordance with a further preferred embodiment of the invention, the at least one LCR resonant circuit has two or more coil-type conductor structures which are formed in different electrically conductive layers and which are arranged in such a way that they enclose a common first area region. The capacitive coupling of the LCR resonant circuit and the antenna structure can thereby be improved further.

Alongside an inductive element provided for example by one or more of the coil-type conductor structures described above, the at least one LCR resonant circuit preferably also has a capacitive element provided by two capacitor areas which are specifically provided therefor and are shaped in the one or more electrically conductive layers. Preferably, in this case the at least one LCR resonant circuit has a first capacitor area, which is shaped in a first of the electrically conductive layer, and a second capacitor area, which is shaped in a second of the electrically conductive layer. At least one dielectric layer, a layer assemblage or the like is arranged between the first electrically conductive layer and the second electrically conductive layer. The at least one first capacitor area and the at least one second capacitor area furthermore at least partly overlap and thus form a capacitive element. The distance separating the electrically conductive layers is preferably between 3 µm and 500 µm, with further preference between 12 µm and 200 µm, with further preference between 30 µm and 75 µm. The length of the capacitor areas is preferably between 3 mm and 75 mm, with further preference between 10 mm and 50 mm, and the width of said capacitor areas is preferably between 3 mm and 45 mm, with further preference between 10 mm and 40 mm. The capacitor areas can also have a form that deviates from a rectangle, and in addition can intrinsically be shaped differently at least in some regions.

Furthermore, it is also possible for two or more capacitor areas of this type to be shaped in an electrically conductive layer, said capacitor areas providing a capacitive element. However, the capacitive element can subsequently also be provided by the inter-turn capacitance between turns or conductor track regions of a coil-type conductor structure or between turns or conductor track sections of coil-type conductor structures that are adjacent, in particular arranged one above another or one above another at least in some regions.

The layer thickness of the electrically conductive layer is preferably less than 30 µm, with further preference less than 8 µm, with further preference between 6 µm and 12 µm or 6 µm and 16 µm. In this case, the electrically conductive layer consists of an electrically conductive material, for example graphite, a metal, for example copper or aluminum, an electrically conductive plastic, for example PEDOT:PSS (poly(3, 4-ethylenedioxythiophene) poly(styrene-sulfonate)), or a transparent electrically conductive material (ITO=Indium Tin Oxide, IMI=Indium tin oxide/Metal/Indium tin oxide) or else of an electrically semiconducting material, for example silicon, or combinations thereof.

Preferably, the second sheet has two or more electrically conductive layers, between which at least one dielectric layer is arranged. Said at least one dielectric layer preferably consists of the carrier layer of the second sheet, which carrier layer is therefore arranged between the two electrically conductive layers.

In the case of an arrangement of this type it is furthermore advantageous if the second sheet has one or more electrically conductive plated-through holes through the layers of the second sheet which are arranged between the two electrically conductive layers.

Consequently, the second sheet preferably consists of the carrier layer, of one or two electrically conductive layers, which are separated from one another by at least one dielectric layer, and one or more further layers, wherein the two electrically conductive layers are connected to one another in some regions by at least one electrically conductive plated-through hole.

In accordance with one preferred exemplary embodiment of the invention, the at least one LCR resonant circuit—as already explained above—is inductively coupled to the antenna structure when the booklet is closed. Such an inductive coupling has the advantage that the distance between the first and second sheets only slightly influences the coupling factor only in a distance range of 1 mm to 5 mm and so, firstly, a variable number of sheets can be arranged between the first and second sheets without the degree of detuning being significantly influenced and, secondly, ambient influences also have only little influence on the coupling factor.

It is advantageous in this case if the antenna structure likewise has a coil-type conductor structure which encloses a second area region at least to the extent of 40%, preferably at least to the extent of 75%, and which is arranged on the carrier layer of the first sheet in such a way that the first and the second area regions at least partly overlap when the booklet is closed.

In a further embodiment it is advantageous if the external dimensions of the LCR resonant circuit/resonant circuits under consideration are larger than the external dimensions of the antenna structure by at least 5%. This allows even better compensation of changes in the inductive coupling factor if the number of sheets in a document such as a security document, for example, varies for different applications and the distance between LCR resonant circuit and antenna structure in the closed state of the booklet thus varies. One example in this respect would be a passport having 48 pages in the normal embodiment, fewer pages, e.g. 36 pages, in an embodiment for temporary uses, or having more than 48 pages in the case of use for diplomatic purposes.

A further embodiment consists in the fact that additional shielding elements, which can have a wide variety of forms, arrangements and embodiments, are concomitantly used alongside the LRC element or elements in direct spatial proximity. In this case, said shielding elements are shaped such that they absorb the signal communicated by the reader (see FIGS. 7a, 7b, 8a and 8b). This embodiment also allows compensation of changes in the inductive coupling factor if the number of sheets in a document such as a security document, for example, varies for different applications and the distance between LCR resonant circuit and antenna structure in the closed state of the booklet thus varies.

In accordance with a further embodiment of the invention, the at least one LCR resonant circuit is capacitively coupled to the antenna structure when the booklet or the book is closed. By virtue of a capacitive coupling of this type, the result of the detuning becomes less reproducible, which can further improve security.

The LCR resonant circuit can also consist of a plurality of separate LCR resonant circuits. By way of example, a plurality of LCR resonant circuits can be distributed on a plurality of sheets of the booklet or book, in particular on sheets which are arranged before and after the sheet with the antenna structure.

In this case, it is provided, for example, that the at least one LCR resonant circuit has at least one first coupling area for capacitive coupling to a second coupling area connected to the antenna structure, wherein the first coupling area is shaped in the electrically conductive layer of the second sheet and the second coupling area is shaped in an electrically conductive layer of the first sheet, and in that the first and the second coupling areas are arranged in such a way that they overlap at least in some regions when the document is closed. It is also possible here for further coupling areas to be formed like the first and second coupling areas. It should be noted in this context that a curvature of the sheets can, of course, influence the result of the capacitive coupling.

Furthermore, it has also proved to be advantageous for the at least one LCR resonant circuit to be connected to the antenna structure by means of a conductor track.

In accordance with one preferred exemplary embodiment of the invention, the one or more electrically conductive layers of the second sheet are shaped in the second region for the formation of two more or more LCR resonant circuits. In this case, the antenna structure and the two or more LCR resonant circuits are arranged on the respective carrier layer in such a way that, when the booklet is closed, the first region of the first sheet and the second region of the second sheet overlap at least in some regions and the at least one subset of the two or more LCR resonant circuits is electromagnetically coupled to the antenna structure.

With regard to the configuration of the two or more LCR resonant circuits, reference is made to explanations above. What is particularly advantageous about this embodiment is that a particularly high degree of detuning of the antenna resonant circuit can thereby be achieved, and that subsequently manufacturing tolerances can also thereby be utilized to the effect that the detuning of the antenna resonant circuit varies from security document to security document and security is thus improved further. This effect is advantageously manifested primarily when between 2 and 8 LCR resonant circuits, in particular between 4 LCR resonant circuits and 6 LCR resonant circuits are arranged in the second region.

Preferably, the two or more LCR resonant circuits are arranged in accordance with a one-, two- or three-dimensional grid in the second sheet. In the case of a one-dimensional grid, provision is made of a sequence of LCR resonant circuits in a first spatial direction. In the case of a two-dimensional grid, provision is made of a sequence of LCR resonant circuits in two spatial directions, which are preferably perpendicular to one another. In the case of a three-dimensional grid, provision is made of a sequence of LCR resonant circuits in three spatial directions, preferably perpendicular to one another, wherein two of the spatial directions lie in the plane spanned by the surface of the second sheet and the third spatial direction is preferably perpendicular to said plane, that is to say that the LCR resonant circuits are arranged one above another.

The grid width of the grid is preferably between 20 mm and 60 mm at least in one spatial direction. With further preference, the grid width of the grid is varied, in particular varied randomly, in at least one spatial direction.

What can be achieved by means of these measures is that the positive effects mentioned above emerge particularly distinctly.

The two or more LCR resonant circuits preferably have the same resonant frequency. Furthermore, it is also possible, however, for at least two of the two or more LCR resonant circuits to have different resonant frequencies. The reproducibility of the result and also the variation of the detuning between different security documents can thereby be influenced further.

In accordance with a further preferred exemplary embodiment of the invention, the one or more electrically conductive layers of the second sheet are shaped in a third region—which adjoins the second region and preferably encloses the second region—for the formation of a layer region that absorbs RF radiation. The one or more electrically conductive layers are shaped in this way over the whole area, for example, in the third region. Furthermore, it is also possible for the electrically conductive layers to be shaped in the form of grating-type pattern in this region, whereby the absorption of the RF radiation can be improved further.

Preferably, the first sheet and the second sheet are a cover sheet of the booklet or of a book, of a similar multipage, preferably bound document or of a layer stack.

By way of example, the second sheet forms the front cover sheet, which forms the front part of the binding of the booklet, and the first sheet forms the back cover sheet, which forms the back part of the binding of the booklet. However, it is also possible for the first sheet and/or the second sheet to be sheets/a sheet lying inside the booklet. Furthermore, it is also possible for the first and the second sheets to be successive sheets of the booklet, particularly in the case of a capacitive coupling between antenna structure and LCR resonant circuit in the "closed" position.

In accordance with a further preferred exemplary embodiment of the invention, the second sheet and/or the first sheet have/has one or more layers forming an optically variable security feature. Said layer or layers is/are preferably selected from the following group:

Layer having a microscopic or macroscopic surface relief, in particular layer having a surface relief having a diffraction-optical effect or a surface relief in the form of optical lens structures, matt structures or blaze gratings, a layer having a thin-film layer system which generates viewing angle-dependent color shift effects, a liquid crystal layer, in particular a cholesteric and/or a nematic liquid crystal layer, and a layer having optically active pigments, in particular effect pigments for luster effects, metallic effects or viewing angle-dependent color shift effects, UV- or IR-activatable pigments.

As already mentioned above, it is particularly advantageous if the second sheet experiences only a small increase in layer thickness as a result of the configuration according to the invention, and, consequently, the layer thickness of the second sheet increases by not more than approximately 10% of the layer thickness of the carrier layer of the second sheet.

It is advantageous here, in particular, if the one or more electrically conductive layers of the second sheet is or are formed by a layer of a transfer layer of a transfer film which is connected to the carrier layer of the second sheet by means of an adhesive layer and which has a layer thickness of between 0.5 μm and 100 μm. A transfer film of this type can be impressed on one side of the carrier layer of the sheet or a respective transfer layer of a transfer film can be impressed on the front and back sides of the carrier layer of the second sheet. Optionally, it is also possible here for another one or more layer plies, in particular printing layers, also to be arranged between the carrier layer and the transfer layer.

In an alternative advantageous embodiment it is provided that the one or more electrically conductive layers of the second sheet are formed on a plastic film, which is connected to the carrier layer of the second sheet by means of an adhesive layer, and wherein the plastic film with the electrically conductive layers has a layer thickness of between 15 μm and 200 μm. A plastic film of this type can be adhesively bonded on one side of the carrier layer of the sheet or a respective plastic film can be adhesively bonded on the front and back sides of the carrier layer of the second sheet. Optionally, it is also possible here for another one or more layer plies, in particular printing layers, also to be arranged between the carrier layer and the plastic film.

BRIEF DESCRIPTION OF THE DRAWINGS

The invention is explained by way of example below on the basis of a plurality of exemplary embodiments with the aid of the accompanying drawings.

FIGS. 7a to 8b show schematic plan views of layers of a sheet of the security document according to FIG. 1 for respective further exemplary embodiments.

DETAILED DESCRIPTION OF THE PREFERRED EMBODIMENTS

Figure 1:
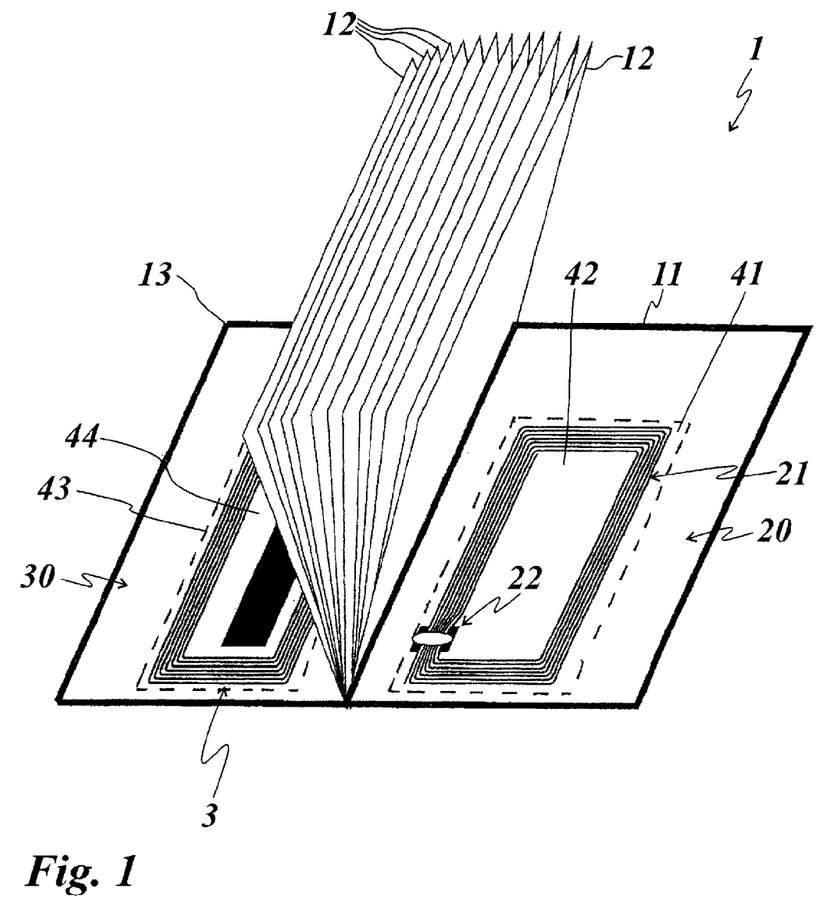
FIG. 1 shows an illustration of a security document.

FIG. 1 shows a security document 1 in the form of a booklet. The security document 1 is, for example, a passport in the form of a passport book, a driver's license, an ID document, a birth certificate, a software certificate or else a valuable document. The security document has sheets 11, 12 and 13, which are connected to one another to form the booklet. The number of sheets in the security document 1 is shown by way of example in FIG. 1 and it is furthermore also possible for the security document to have just two sheets, i.e. two pages, which are movable relative to one another in foldable fashion at a fold.

The sheets 11, 12 and 13 each have a carrier layer composed of a paper substrate. It is also possible, however, for the carrier layer to consist of a plastic film, for example of a PET, PEN or BOPP film or the like, a multilayer structure (laminate) or the like, preferably having a layer thickness of between 10 and 250 μm. The sheets 11 to 13 of the security document 1 are connected to one another to form the booklet for example by means of sewing or adhesive bonding, as can be discerned in FIG. 1.

Alongside the carrier layer, the sheets 11 to 13 optionally also have one or more printing layers that provide, in particular, optically readable information about the passport holder. The pages 11 and 13 are specially configured in this case, as explained below.

Alongside a carrier layer 20, the page 11 also has an antenna structure 21 and an electronic circuit 22 connected to the antenna structure 21. The antenna structure 21 is arranged in a region 41 and consists of a patterned metal layer for example in the form of an antenna coil, as is indicated in FIG. 1. The antenna structure is directly electrically connected to the electronic circuit 22, which is provided in the form of a microchip, for example. In this case, the microchip preferably consists of a silicon-based chip having a silicon carrier substrate thinned by grinding, or a so-called chip module, with a chip housing and leadframe incorporated into an epoxy resin. However, it is also possible for the electronic circuit 22 to consist of a polymer electronic circuit connected to the antenna structure 21 by means of a conductive adhesive, for example. The electronic circuit 22 can also have a combination of a conventional microchip with a polymer electronic circuit. The electronic circuit 22 comprises a multiplicity of active and passive electronic components such as transistors, diodes, resistors and capacitors, which are connected to one another in a circuit-conforming manner in order to provide the functions described below:

The electronic circuit has a memory device, in which are stored data, in particular data about the passport holder, for example information concerning the person of the passport holder, biometric data such as fingerprint or photograph of the holder, and, if appropriate, data regarding read-out authorization. Furthermore, the electronic circuit 22 has a communication device, which allows the data stored in the memory device to be communicated to a reader via a radio interface by means of the antenna structure. In this case, the communication device communicates the data in response to a request signal from the reader, on the basis of a predefined communication protocol and modulation method, to the reader by means of the antenna structure. The communication device thus has a corresponding RF part for receiving/transmitting RF signals by means of the antenna structure 21 via the air interface and also assemblies for processing the protocol stacks necessary for communication. Furthermore, the electronic circuit 22 preferably also comprises assemblies for carrying out secure communication with the reader, that is to say assemblies for processing corresponding authentication protocols and for encrypting the data communicated via the air interface and also decrypting the data received via the air interface.

The antenna structure 42 is arranged in the region 41 of the sheet 11 in a fixed position with respect to the carrier layer 20 of the sheet 11 and connected to the carrier layer 20 by means of an adhesive layer, for example. The electronic circuit 22 is arranged in a cutout of the carrier layer 20, for example. Above and below the antenna structure 21 and the electronic circuit 22, the sheet 11 can also have one or more further layers, such that the antenna structure 21 and the electronic circuit 22 are surrounded for example on both sides by one or more preferably opaque layers of the sheet 11 and thus remain hidden to the user of the security document 1.

Furthermore, an area region 42 is enclosed by the antenna structure 21 shaped in coil-type fashion.

Furthermore, it is also possible, however, for the antenna structure 21 not to have the coil-type shaping shown in FIG. 1, but rather to have any other shaping desired, for example the form of a bipole, dipole or slot antenna or a mixed form of different antenna forms. It is also possible here for the antenna structure to be formed in multilayered fashion. Thus, it is possible, for example, for the antenna structure to consist of a three-layered system consisting of a PET carrier having a thickness of approximately 50 μm and copper layers applied on both sides of the PET carrier, which are in each case shaped to form a coil-type conductor structure, as indicated in FIG. 1, and the region 41 in this case occupies an area of 78×48 mm. The two copper layers are connected to one another via plated-through holes and form contact pads for the electronic circuit 22, onto which the electronic circuit is soldered. The antenna resonant circuit formed by the antenna structure 21 and those components of the electronic circuit 22 which are connected to the antenna structure in this case preferably has a resonant frequency of between 12 and 20 MHz, for example a resonant frequency of 13.56 MHz.

Alongside a carrier layer 30, the sheet 13 has one or more electrically conductive layers, which are shaped in a region 43 for the formation of at least one LCR resonant circuit 3.

Figure 2:
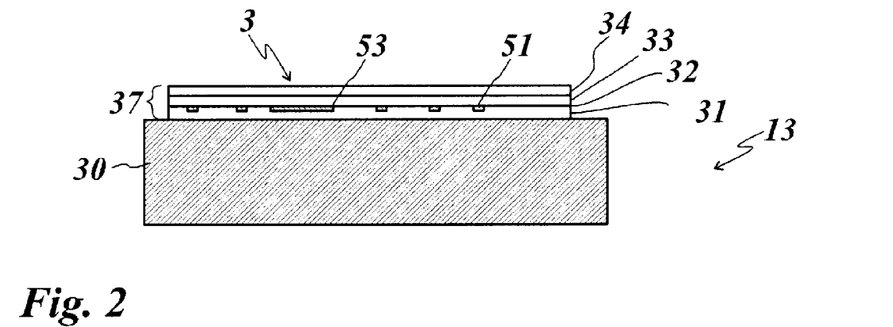
FIG. 2 shows a schematic sectional illustration of a sheet of the security document according to FIG. 1.

By way of example, the sheet 13 has the layer construction shown in FIG. 2, comprising the carrier layer 30 and the film element 37 applied on the carrier layer 30. In this case, the film element 37 preferably consists of a transfer layer of a transfer film, in particular of a hot embossing film, said transfer layer being applied to the carrier layer 30. The transfer layer of the transfer film preferably has a plurality of layers, e.g. metal layers applied by vapor deposition and/or by electrodeposition, transparent or opaque layers applied by printing or lacquering. In this case, the film element 37 can also be formed as a self-supporting plastic film and have layers applied by means of different methods, e.g. metal layers applied by vapor deposition and/or by electrodeposition, transparent or opaque layers applied by printing or lacquering. In this case, the film element 37 can be applied to the carrier layer 30 over the whole area or else only in some regions, as is indicated in FIG. 2.

The film element 37 has an adhesive layer 31, an electrically conductive layer 32, a decoration layer 33 and a protective lacquer layer 34.

The decoration layer 33 and the protective lacquer layer 34 could also be dispensed with and, alongside the layers shown in FIG. 2, even further layers could also be provided in the film element 37, for example further decoration layers, adhesion promoting layers or protective layers.

In this case, the electrically conductive layer 32 preferably consists of a metal layer, in particular a copper layer having a layer thickness of between 5 and 20 μm, for example of 12 μm. Instead of a metal, for the electrically conductive layer 32 it is also possible to use some other conductive or semiconducting material, for example a semiconducting polymer or combinations of different conductive materials. In this case, the electrically conductive layer 32 is shaped for the formation of an LCR resonant circuit and thus formed for example in the form of a coil-type conductor structure 51 having a plurality of turns and a capacitor area 53 connected to said coil-type conductor structure, which provide firstly an inductive component (by virtue of the coil-type structure), a capacitive component (by virtue of the inter-turn capacitance and the capacitance of the turns with respect to the capacitor area), and also a resistance component (by virtue of the conduction resistance of the coil-type conductor structure 51 and of the capacitor area 53) and thus form an LCR resonant circuit. The coil-type conductor structure 51 likewise has, for example, an external dimensioning of 78×48 mm and the width of the conductor track of the coil-type conductor structure 51 is preferably between 0.05 mm and 5 mm, for example 0.65 mm, and the turns of the coil-type conductor structure 51 are preferably at a distance of between 0.05 mm and 1 mm from one another, for example at a distance of 0.5 mm from one another. The capacitor area 53 has, for example, a dimensioning of 40×15 mm. In this context it is pointed out that the illustration in FIG. 2 as also in the following figures do not constitute illustrations true to scale, but rather merely constitutes a schematic illustration for elucidating the functional principle.

The adhesive layer 31 has a layer thickness of 0.5 μm to 80 μm.

The decoration layer 32 consists, for example, of a color lacquer layer having a layer thickness of 0.5 to 20 μm. However, it is also possible for the decoration layer to be a layer that provides an optically variable security feature. Thus, it is possible, for example, for the decoration layer 33 to have a replication lacquer layer into which an optically active surface relief is molded, in particular a microscopic or macroscopic surface relief is molded. A surface relief of this type is preferably a surface relief having a diffraction-optical effect, for example a hologram or Kinegram®. However, it is also possible for the surface relief to be a microscopic or macroscopic lens structure, a matt structure or a blaze grating. In this case, the surface relief is coated with a corresponding reflection-increasing layer, for example a reflection layer or an HRI layer (HRI=High Refractive Index). In this case, it is particularly advantageous if the electrically conductive layer 32 has a double function and both forms the LCR resonant circuit and forms the reflection layer or reflection-increasing layer for the provision of the optically variable security feature. Furthermore, the layer 33 can also comprise a thin-film layer system for generating viewing angle-dependent color shift effects or contain a liquid crystal layer, a layer having optically active pigments, for example effect pigments, UV- or IR-activatable pigments. The decoration layer 33 can also be constructed in a multilayered fashion and thus comprise, for example, a plurality of color lacquer layers combined with one or more of the above-outlined layers that generate an optically variable effect.

The protective layer 34 preferably consists of a lacquer layer having a layer thickness of 1 to 50 µm, preferably 1 µm to 15 µm.

Figure 3:
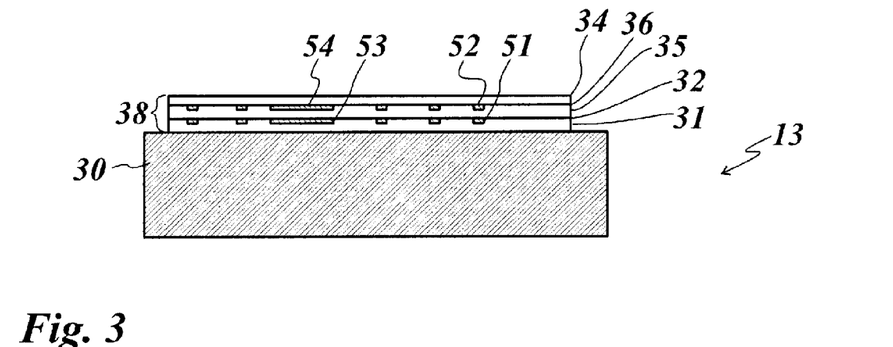
FIG. 3 shows a schematic sectional illustration of a sheet of the security document according to FIG. 1 for a further exemplary embodiment.

FIG. 3 shows an alternative embodiment of the sheet 13. In this case, the carrier layer 30 is coated with a film element 38, which, alongside the layers 31, 32 and 34 according to FIG. 2, also has a dielectric layer 35 and a further electrically conductive layer 36. With regard to the configuration of the layers 31, 32, and 34, reference is made to the explanations according to FIG. 2. The further electrically conductive layer 35 is likewise part of the LCR resonant circuit formed in the region 43 and is shaped in the same way as the layer 32 in the form of a coil-type conductor structure 52 and a capacitor area 54. With regard to the configuration of the layer 36, reference is therefore likewise made to the explanations concerning the configuration of the layer 32. The electrically conductive layers 32 and 36 are coupled to one another capacitively or inductively or else directly electrically by means of plated-through holes through the dielectric layer 35. The dielectric layer 35 can be, for example, a resist layer having a thickness of 3 µm to 12 µm or else a plastic film, for example a PET film having a layer thickness of 12 µm to 200 µm. Furthermore, in addition to the layers shown in FIG. 3, another one or more decoration layers, configured like the decoration layer 33 according to FIG. 2, can also be provided in the film element 38. Said decoration layers can be arranged between each of the layers 34 to 31.

Figure 4:
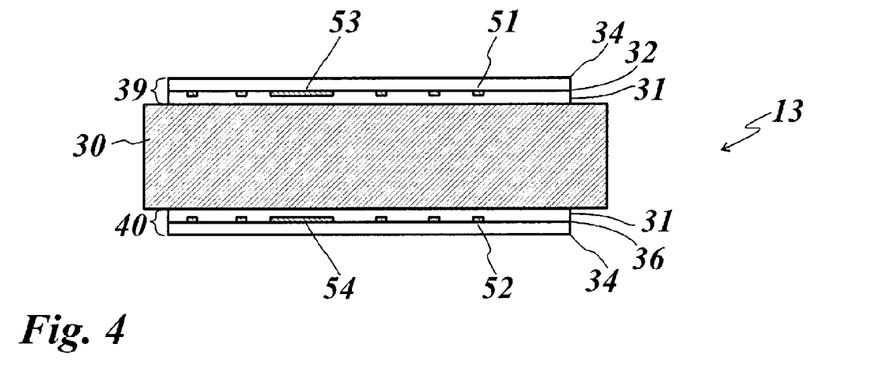
FIG. 4 shows a schematic sectional illustration of a sheet of the security document according to FIG. 1 for a further exemplary embodiment.

FIG. 4 shows a further embodiment of the sheet 13. Here, too, a film element is applied to the carrier layer 30, on both sides, namely the film element 39 and the film element 40, respectively. The film element 39 has the adhesive layer 31, the electrically conductive layer 32 and the protective lacquer layer 34, which are formed in the manner described with regard to FIG. 2. The film element 40 has the adhesive layer 31, the electrically conductive layer 36 and the protective lacquer layer 34, which are formed in the manner already described above with regard to FIG. 3. Furthermore, it is possible here, too, for even further layers alongside the layers shown in FIG. 4 to be provided in the film elements 39 and 40, in particular a decoration layer, which is formed in accordance with the decoration layer 33 according to FIG. 2.

Figure 5:
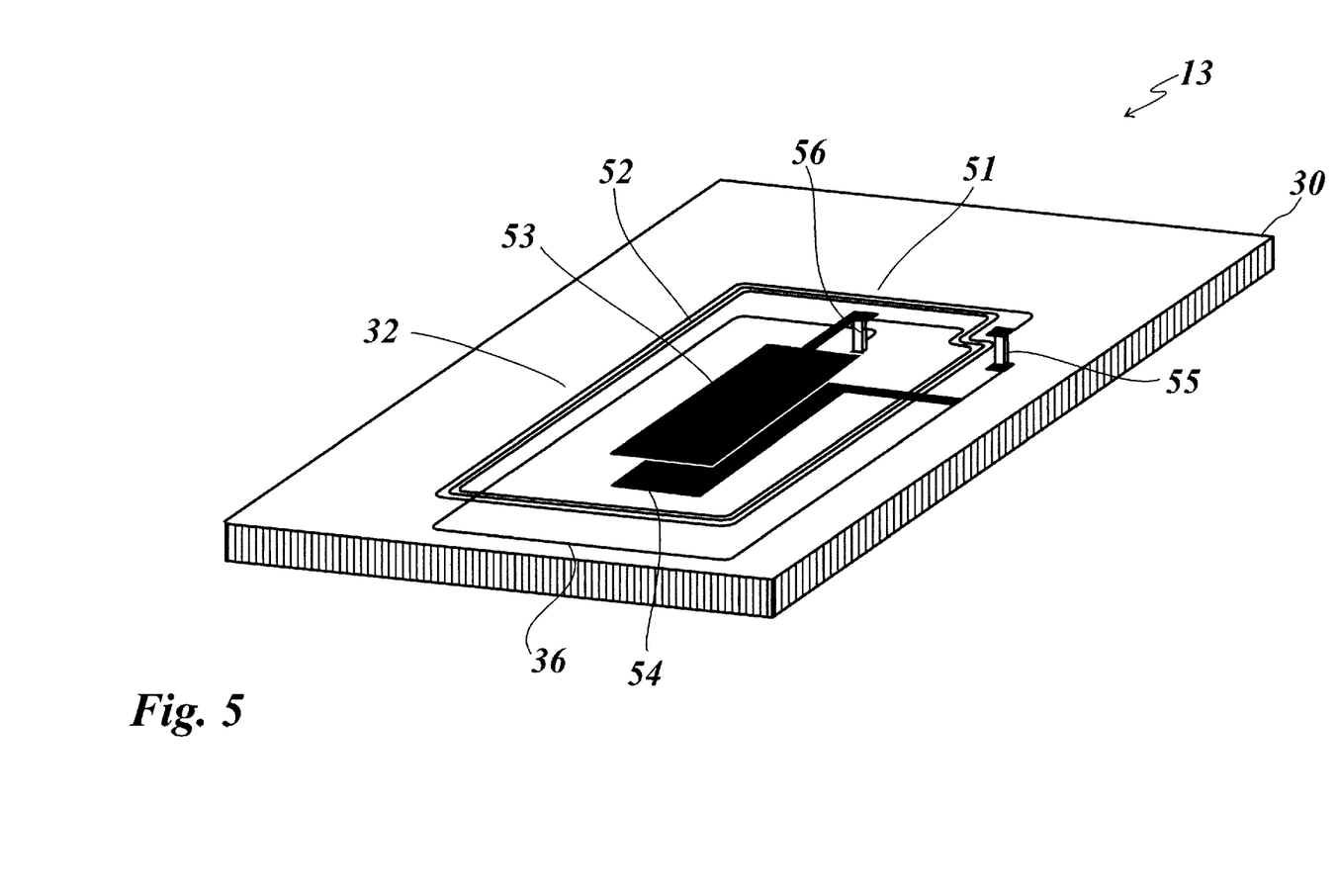
FIG. 5 shows a schematic illustration of a sheet of the security document according to FIG. 1 for a further exemplary embodiment.

FIG. 5 shows a further embodiment of the sheet 13. In this case, electrically conductive layers are applied to the carrier layer 30 on both sides. The carrier layer 30 thus consists, for example, of a plastic film, for example a PET film having a layer thickness of 12 µm to 200 µm, preferably between 30 µm and 75 µm, here of approximately 50 mm, to which the electrically conductive layers 32 and 36 already described above are applied. Thus, by way of example, the layer 32 is applied on the top side and the layer 36 on the underside of the carrier layer 30. The layers 32 and 36 can be configured in the manner explained above with regard to FIG. 2 and FIG. 3. In this case, it is particularly advantageous if the electrically conductive layers 32 and 36 in each case consist of a metallic layer, which, by way of example, are constructed by means of electrolytic reinforcement of a conductive pattern applied to the carrier layer 30 on the carrier layer 30. As already described above in the case of the explanations concerning FIG. 2 and FIG. 3, the electrically conductive layer 32 is in this case shaped in the form of a coil-type conductor structure 51 and a capacitor area 53 and the electrically conductive layer 36 is shaped in the form of a coil-type conductor structure 52 and a capacitor area 54.

One advantageous embodiment provides for the antenna structure 21 (and also the electronic circuit 22 connected to the antenna structure 21) and the LCR resonant circuit 3 to be arranged on a common carrier layer, wherein the carrier layer is inserted into a spine of the security document (in a manner similar to that illustrated in FIG. 1) and has a first half and a second half, which are optionally separated by folding, wherein the first half forms the carrier substrate of the sheet 11 and the second half forms the carrier substrate of the sheet 13. The antenna structure 21 is arranged on the first half of the carrier layer and the LCR resonant circuit is arranged on the second half of the carrier layer. In this case, it is advantageous if the first half of the carrier layer 30 with the antenna structure 21 is connected, including by adhesive bonding, to a first binding side of the security document 1 and if the second half of the carrier layer with the LCR resonant circuit 3 is connected, including by adhesive bonding, to a second binding side of the security document 1. By virtue of this arrangement of the two elements, antenna structure 21 and LCR resonant circuit 3, that are electromagnetically coupled in the "closed" state of the booklet, antenna structure 21 and LCR resonant circuit 3 can be produced correspondingly cost-effectively and rapidly by means of a common production process and then be connected to the security document simply and rapidly. The common carrier layer can be inserted in one piece into the booklet to be produced, and can be adhesively bonded and/or stitched/sewn in and forms one unit with the booklet. Only by destroying the booklet and/or the carrier layer 30 is it possible to remove the antenna structure 21 and the LCR resonant circuit 3 from the booklet. Advantages are thus afforded in particular for the production process of antenna structure 21 and LCR resonant circuit 3 and later of the booklet. The production process for simultaneously producing antenna structure 21 and LCR resonant circuit 3 can be e.g. a conventional metallization method/demetallization method (application by vapor deposition/printing of metals and subsequent etching method or washing mask or washing resist method, application by vapor deposition/printing of an electrically conductive layer and subsequent electrolytic reinforcement).

Furthermore, the conductor structures of the electrically conductive layers 32 and 36 are connected to one another to form an LCR resonant circuit by means of two plated-through holes 55 and 56 through the carrier layer 30. This is explained below with reference to FIGS. 6a to 6c.

Figure 6A:
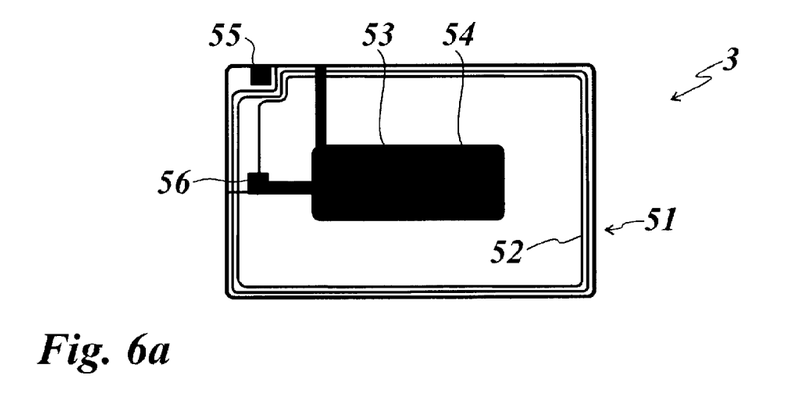
FIGS. 6a to 6c show schematic plan views of layers of the sheet according to FIG. 5.

FIG. 6a shows a plan view of the region 43 of the sheet 13, in which the LCR resonant circuit 3 is formed. In this case, FIG. 6a shows the resultant overlapping arrangement of the conductor structures of the electrically conductive layer 32 and the conductor structures of the electrically conductive layer 36.

Figure 6B:
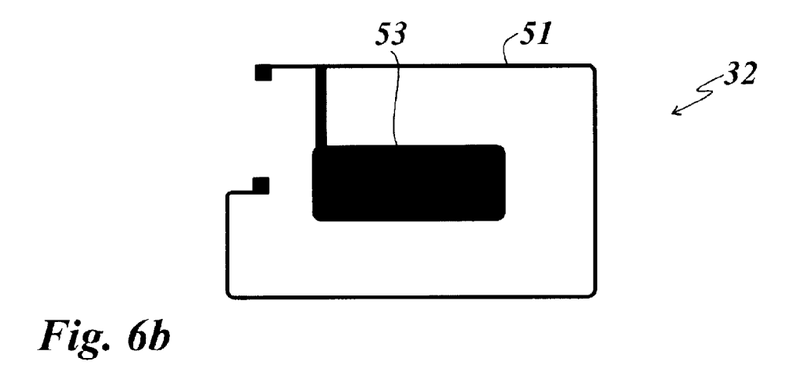
Figure 6C:
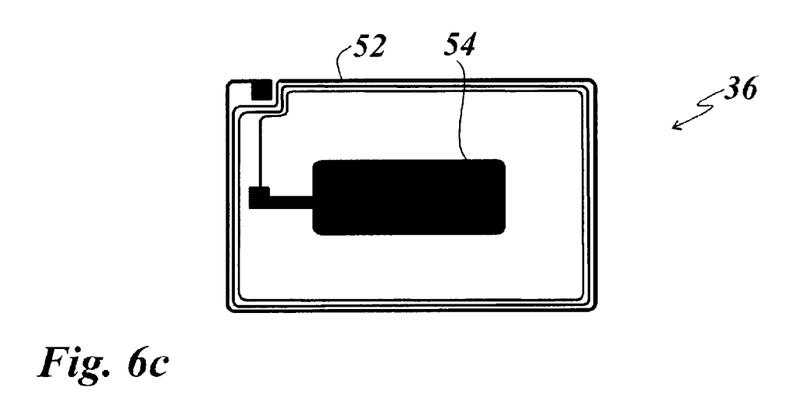
Figure 7A:
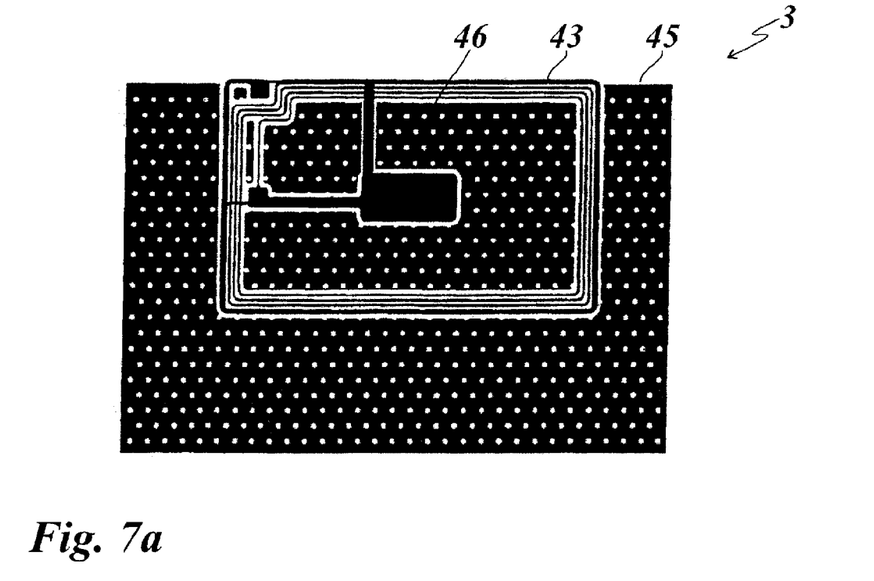
Figure 7B:
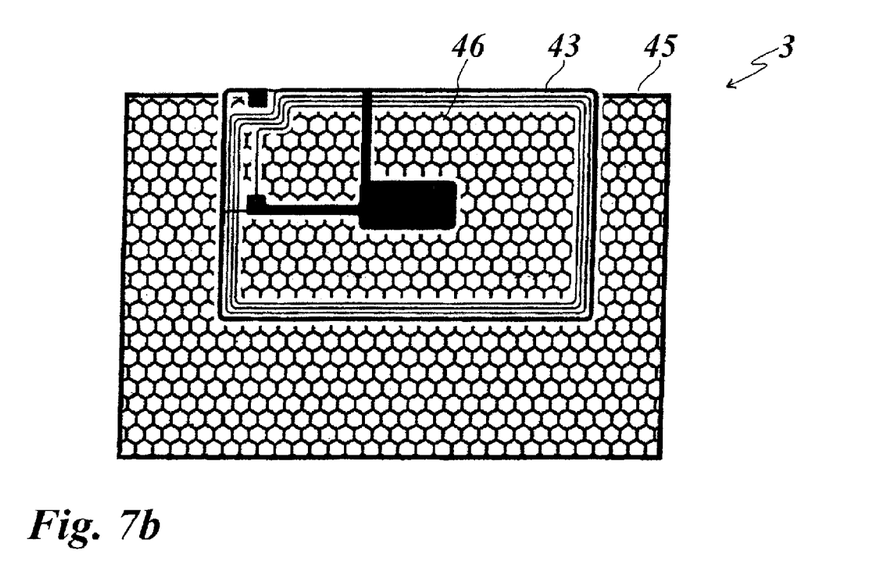
Figure 8A:
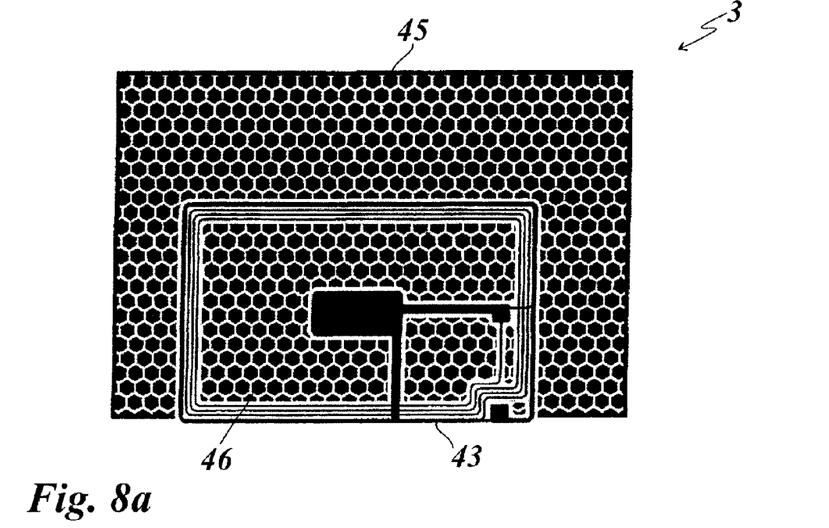
Figure 8B:
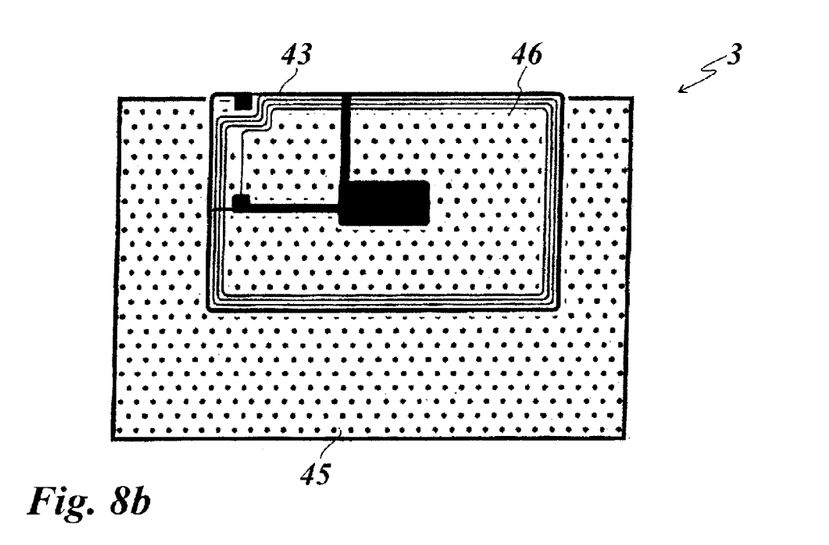

FIG. 6b then shows separately the shaping of the electrically conductive layer 32 with the coil-type conductor structure 52 and the capacitor area 53, and FIG. 6c shows separately the shaping of the electrically conductive layer 36 with the coil-type structure 52 and the capacitor area 54. The region 34 in this case has a dimensioning of 78×48 mm, for example, and the layer thickness of the electrically conductive layers 32 and 36 is approximately 12 μm, the conductor track width of the coil-type conductor structures 51 and 52 is approximately 0.65 mm and the distance between the turns of the coil-type conductor structure 52 is approximately 0.5 mm. As shown in FIG. 6b and FIG. 6c, the coil-type conductor structure 51 has approximately 0.8 turn and the coil-type conductor structure 52 has approximately 3.2 turns, such that a coil-type conductor structure having approximately four turns arises overall upon the coupling of the electrically conductive layer 32 and 36 by means of the plated-through holes 55 and/or 56. It is also possible to dispense with the plated-through hole 55. The capacitor areas 53 and 54 have approximately a dimensioning of 40×15 mm and are arranged in overlapping fashion, as shown in FIG. 6a. The configuration and connection of the electrically conductive layers 32 and 36 according to FIG. 6a to FIG. 6c give rise to an LCR resonant circuit having an inductance of 3.9 μH, a capacitance of 105.2 pF, a resonant frequency of 7.3 MHz and a quality factor of 20.

If, by way of example, the size of the capacitor areas 53 and 54 or else the number of turns of the coil-type structures is varied, then a correspondingly different resonant frequency arises. If, by way of example, the area of the capacitor areas 53 and 54 is thus chosen differently, for example chosen with a size of 60×20 mm, this gives rise to an LCR resonant circuit 33 having an inductance of 3.9 μH, a capacitance of 187.7 pF and a resonant frequency of 7.6 MHz.

The coil-type structures 51 and 52 and also the capacitor areas 53 and 54 are then chosen in a manner dependent on the resonant frequency of the antenna resonant circuit—as explained above—such that the resonant frequency of the LCR resonant circuit 3 differs from the resonant frequency of the antenna resonant circuit by more than 10%, more than 25%, more than 41% or more than 50% and/or by more then 1.5 MHz, more than 4 MHz, more than 5.5 MHz or more than 8 MHz.

Furthermore, it is also possible for those regions of the electrically conductive layer 32 and/or 36 which surround the coil-type conductor structures 51 and 52 and/or the capacitor areas 53 and 54 likewise to be provided (in a patterned fashion) with the electrically conductive materials of the electrically conductive layer(s) 32 and/or 36. In this respect, FIG. 7a to FIG. 8b show a plurality of embodiments in which these area regions, the area regions 45 and 46, are respectively covered with a conductive material with a patterned shaping. In this case, it would also be possible, rather than both area regions, the area region 46 (area region within the coil-type conductor structures 51 and 52) and the area region 45 (area region outside the coil-type conductor structures 51 and 52), being covered with an electrically conductive material in a patterned fashion, for just one of these two area regions to be covered therewith. By virtue of the area regions 46 and/or 45 being covered with electrically conductive material in this way, as shown in FIGS. 7a to 8b, an additional attenuation of the read signal of the reader is brought about if the sheet 13 is arranged between the reader and the sheet 11.

Figure 9:
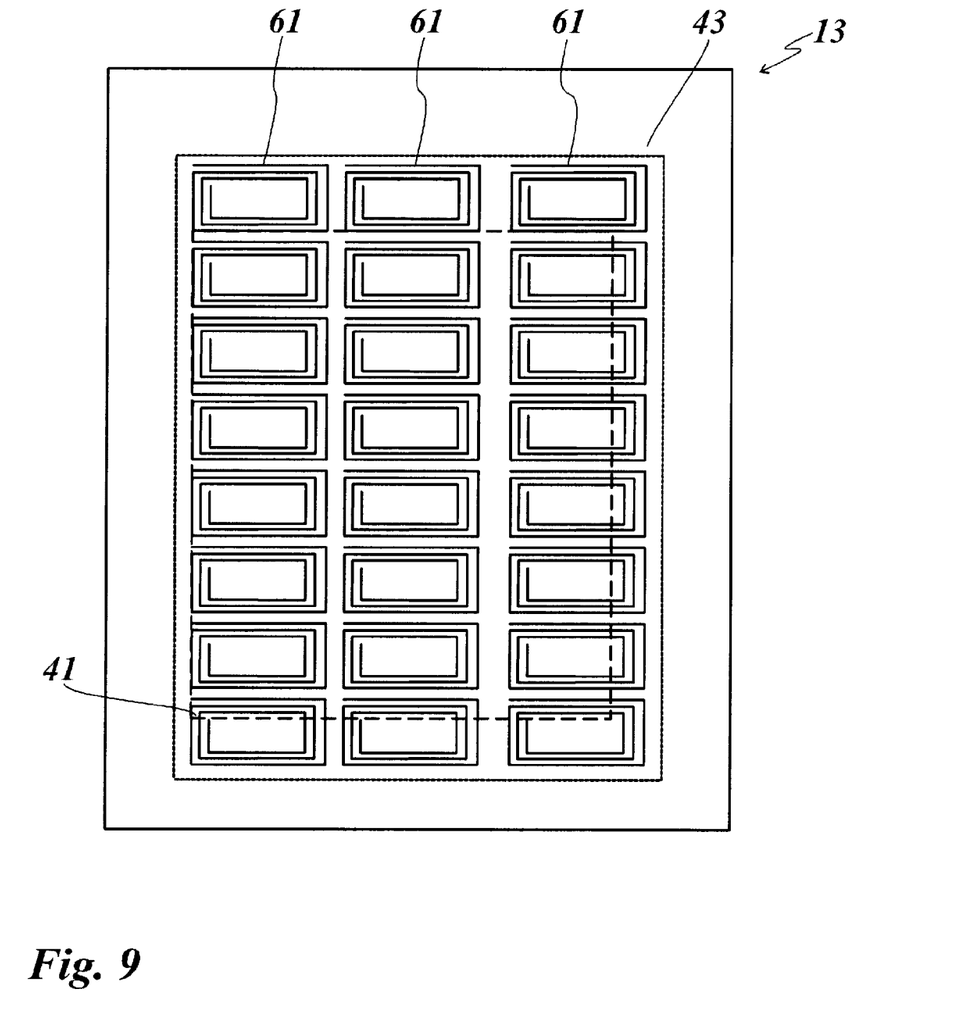
FIG. 9 shows a schematic plan view of a sheet of the security document according to FIG. 1 for a further exemplary embodiment.

FIG. 9 shows a further possibility for the configuration of the sheet 13. In this case, a plurality of LCR resonant circuits 61 are arranged in the region 43. Thus, by way of example, FIG. 9 shows an arrangement of the LCR resonant circuits 61 in accordance with a two-dimensional grid, wherein the grid width, that is to say the distance between the area centroids of adjacent LCR resonant circuits, is between 20 mm and 40 mm in one direction and between 40 mm and 60 mm in the other direction. The LCR resonant circuits are formed here for example in each case by a coil-type structure shaped in the electrically conductive layer 32, as is illustrated in FIG. 9. However, the individual LCR resonant circuits 61 can likewise be configured in the manner explained above with reference to FIG. 2 to FIG. 8b.

In this case, the resonant frequency of the LCR resonant circuits 61 is preferably chosen to be identical and—as explained above—is chosen with respect to the resonant frequency of the antenna resonant circuit. Furthermore, it is also possible here for the resonant frequencies of the LCR resonant circuits 61 to be chosen to be different.

The arrangement comprising a multiplicity of LCR resonant circuits as shown in FIG. 9 in this case leads to a particularly good coupling and hence detuning of the antenna resonant circuit. Furthermore, deviations within the scope of the register tolerance can already lead to different detuning of the antenna resonant circuit, such that the detuning of different security documents differs on account of the register fluctuations that occur during production, and security is increased further as a result. Thus, the overlapping of the region 43 by the region 41 is indicated by way of example in FIG. 9. As can be discerned there, the covering of different LCR resonant circuits 61 by the region 41 and hence the coupling of the antenna structure 21 to the respective LCR resonant circuits 61 vary even in the case of small register fluctuations, as a result of which the detuning of the antenna resonant circuit then also changes accordingly. This effect leads to particularly great changes in the detuning of the antenna resonant circuit if the resonant frequencies of the LCR resonant circuits 61 differ among one another.

What is claimed is:

1. A security document in the form of a booklet which has a large number of sheets connected to one another to form the booklet, wherein a first sheet of the security document has a carrier layer, an antenna structure arranged in a first region for RF communication and an electronic circuit connected to the antenna structure with a memory device for storing data, and a communication device connected to the antenna structure for communicating data stored in the memory device to a reader via a radio interface by means of the antenna structure, wherein a second sheet of the security document has a carrier layer and two or more electrically conductive layers shaped in a second region for the formation of at least one LCR (inductive-capacitance-resistance) resonant circuit, and wherein the antenna structure and the at least one LCR resonant circuit are arranged on the respective carrier layer in such a way that, when the booklet is closed, the first region of the first sheet and the second region of the second sheet overlap at least in some regions and the at least one LCR resonant circuit is electromagnetically coupled to the antenna structure, and
wherein the LCR resonant circuit comprises a first coil-type conductor structure shaped in a first of the two or more electrically conductive layers, a second coil-type conductor structure shaped in a second of the two or more electrically conductive layers and a dielectric layer arranged between the first and second coil-type conductor structures.

2. A security document according to claim 1, wherein the at least one LCR resonant circuit has a resonant frequency which differs by at least 10% from the carrier frequency used for the RF communication and/or from the resonant frequency of the antenna resonant circuit comprising the antenna structure in the open state of the booklet.

3. A security document according to claim 1, wherein the resonant frequency of the at least one LCR resonant circuit is between 2 MHz and 12 MHz.

4. A security document according to claim 1, wherein the external dimensions of the at least one LCR resonant circuit are larger than the external dimensions of the antenna structure by at least 5%.

5. A security document according to claim 1, wherein the first and second coil-type conductor structures enclose a first area region at least to the extent of 40%.

6. A security document according to claim 1, wherein three or more capacitor areas are shaped in the one or more electrically conductive layers.

7. A security document according to claim 1, wherein the first and second coil-type conductor structures are arranged in such a way that they enclose a common first area region.

8. A security document according to claim 1, wherein each of the electrically conductive layers has a layer thickness of less than 30 μm.

9. A security document according to claim 1, wherein at least one of the first and second coil-type conductor structures has between 0.75 and 30 turns.

10. A security document according to claim 1, wherein the at least one LCR resonant circuit is inductively coupled to the antenna structure when the booklet is closed.

11. A security document according to claim 1, wherein the antenna structure has a coil-type conductor structure which encloses a second area region and which is arranged on the carrier layer of the first sheet in such a way that the first and the second area regions at least partly overlap when the booklet is closed.

12. A security document according to claim 1, wherein the at least one LCR resonant circuit is capacitively coupled to the antenna structure when the booklet is closed.

13. A security document according to claim 12, wherein the at least one LCR resonant circuit has at least one coupling area for capacitive coupling to a second coupling area connected to the antenna structure, wherein the first coupling area is shaped in the electrically conductive layer of the second sheet and the second coupling area is shaped in an electrically conductive layer of the first sheet, and wherein the first and the second coupling areas are arranged in such a way that they overlap at least in some regions when the document is closed.

14. A security document according to claim 1, wherein the at least one LCR resonant circuit is connected to the antenna structure by means of a conductor track.

15. A security document according to claim 1, wherein the first sheet and/or the second sheet are/is a cover sheet of the booklet, which forms the front part of the binding of the booklet, and the first sheet is the back cover sheet, which forms the back part of the booklet.

16. A security document according to claim 1, wherein the first and the second sheets are successive sheets of the booklet.

17. A security document according to claim 1, wherein the second sheet and/or the first sheet have/has one or more layers forming an optically variable security feature.

18. A security document according to claim 1, wherein the one or more electrically conductive layers of the second sheet is or are formed by a transfer layer of a transfer film which is connected to the carrier layer of the second sheet by means of an adhesive layer and which has a layer thickness of between 1 and 80 μm.

19. A security document according to claim 1, wherein the one or more electrically conductive layers of the second sheet is or are formed on a plastic film, wherein the plastic film is connected to the carrier layer of the second sheet by means of an adhesive layer, and wherein the film element formed from the plastic film and the one or more electrically conductive layers has a layer thickness of between 10 and 200 μm.

20. A security document according to claim 1, wherein the antenna structure and the LCR resonant circuit are arranged on a common plastic film, wherein the plastic film is inserted into a spine of the security document, and wherein the antenna structure is arranged on a first half of the plastic film and the LCR resonant circuit is arranged on a second half of the plastic film.

21. A security document according to claim 20, wherein the first half of the plastic film with the antenna structure is connected to a first binding side of the security document, and wherein the second half of the plastic film with the LCR resonant circuit is connected to a second binding side of the security document.

22. A security document in the form of a booklet which has a large number of sheets connected to one another to form the booklet, wherein a first sheet of the security document has a carrier layer, an antenna structure arranged in a first region for RF communication and an electronic circuit connected to the antenna structure with a memory device for storing data, and a communication device connected to the antenna structure for communicating data stored in the memory device to a reader via a radio interface by means of the antenna structure, wherein a second sheet of the security document has a carrier layer and one or more electrically conductive layers shaped in a second region for the formation of at least one LCR (inductive-capacitance-resistance) resonant circuit, and wherein the antenna structure and the at least one LCR resonant circuit are arranged on the respective carrier layer in such a way that, when the booklet is closed, the first region of the first sheet and the second region of the second sheet overlap at least in some regions and the at least one LCR resonant circuit is electromagnetically coupled to the antenna structure, and wherein the at least one LCR resonant circuit has a first capacitor area, which is shaped in a first of the electrically conductive layers, and a second capacitor area, which is formed in a second of the electrically conductive areas, and wherein a dielectric layer is arranged between the first electrically conductive layer and the second electrically conductive layer, and wherein the first capacitor area and the second capacitor area at least partly overlap.

23. A security document according to claim 22, wherein the first and the second capacitor areas are respectively connected to a coil-type conductor structure respectively shaped in the first and second electrically conductive layers.

24. A security document according to claim 22, wherein two or more coil-type conductor structures are formed in one of the electrically conductive layers.

25. A security document in the form of a booklet which has a large number of sheets connected to one another to form the booklet, wherein a first sheet of the security document has a carrier layer, an antenna structure arranged in a first region for RF communication and an electronic circuit connected to the antenna structure with a memory device for storing data, and a communication device connected to the antenna structure for communicating data stored in the memory device to a reader via a radio interface by means of the antenna structure, wherein a second sheet of the security document has a carrier layer and one or more electrically conductive layers shaped in a second region for the formation of at least one LCR (inductive-capacitance-resistance) resonant circuit, and wherein the antenna structure and the at least one LCR resonant circuit are arranged on the respective carrier layer in such a way that, when the booklet is closed, the first region of the first sheet and the second region of the second sheet overlap at least in some regions and the at least one LCR resonant circuit is electromagnetically coupled to the antenna structure, and wherein the second sheet has one or more electrically conductive plated-through holes through the layers of the second sheet which are arranged between two of the electrically conductive layers.

26. A security document according to claim 25, wherein the second sheet has at least one dielectric layer arranged between the two electrically conductive layers.

27. A security document according to claim 26, wherein the carrier layer of the second sheet is a dielectric layer and is arranged as dielectric layer between two of the electrically conductive layers.

28. A security document in the form of a booklet which has a large number of sheets connected to one another to form the booklet, wherein a first sheet of the security document has a carrier layer, an antenna structure arranged in a first region for RF communication and an electronic circuit connected to the antenna structure with a memory device for storing data, and a communication device connected to the antenna structure for communicating data stored in the memory device to a reader via a radio interface by means of the antenna structure, wherein a second sheet of the security document has a carrier layer and one or more electrically conductive layers shaped in a second region for the formation of at least one LCR (inductive-capacitance-resistance) resonant circuit, and wherein the antenna structure and the at least one LCR resonant circuit are arranged on the respective carrier layer in such a way that, when the booklet is closed, the first region of the first sheet and the second region of the second sheet overlap at least in some regions and the at least one LCR resonant circuit is electromagnetically coupled to the antenna structure, and wherein the one or more electrically conductive layers of the second sheet are shaped in the second region for the formation of two or more LCR resonant circuits, and wherein the antenna structure and the two or more LCR resonant circuits are arranged on the respective carrier layer in such a way that, when the booklet is closed, the first region of the first sheet and the second region of the second sheet overlap at least in some regions and the at least one subset of the two or more LCR resonant circuits is electromagnetically coupled to the antenna structure.

29. A security document according to claim 28, wherein the two or more LCR resonant circuits are arranged in accordance with a one-, two- or three-dimensional grid on the carrier layer of the second sheet.

30. A security document according to claim 29, wherein the grid widths of the grid are between 20 mm and 60 mm in at least one spatial direction.

31. A security document according to claim 29, wherein the grid widths of the grid vary in at least one spatial direction.

32. A security document according to claim 28, wherein the two or more LCR resonant circuits have the same resonant frequency.

33. A security document according to claim 28, wherein at least two of the two or more LCR resonant circuits have different resonant frequencies.

34. A security document in the form of a booklet which has a large number of sheets connected to one another to form the booklet, wherein a first sheet of the security document has a carrier layer, an antenna structure arranged in a first region for RF communication and an electronic circuit connected to the antenna structure with a memory device for storing data, and a communication device connected to the antenna structure for communicating data stored in the memory device to a reader via a radio interface by means of the antenna structure, wherein a second sheet of the security document has a carrier layer and one or more electrically conductive layers shaped in a second region for the formation of at least one LCR (inductive-capacitance-resistance) resonant circuit, and wherein the antenna structure and the at least one LCR resonant circuit are arranged on the respective carrier layer in such a way that, when the booklet is closed, the first region of the first sheet and the second region of the second sheet overlap at least in some regions and the at least one LCR resonant circuit is electromagnetically coupled to the antenna structure, and, wherein the LCR resonant circuit has one or more coil-type conductor structures shaped in the one or more electrically conductive layers of the second sheet in the second region, and wherein the one or more electrically conductive layers of the second sheet are shaped in a third region which adjoins the second region for the formation of an absorber structure that absorbs RF radiation, the absorber structure having a different structure than the one or more coil-type conductor structures and comprising a continuous metal area or a grating-type pattern metal area.

* * * * *